United States Patent [19]

Zborowski

[11] 4,238,855
[45] Dec. 9, 1980

[54] PARALLEL OPERATION OF MULTIPLE TV TRANSMITTERS

[75] Inventor: Ronald W. Zborowski, Houston, Pa.

[73] Assignee: RCA Corporation, New York, N.Y.

[21] Appl. No.: 76,850

[22] Filed: Sep. 19, 1979

[51] Int. Cl.³ .......................... H04B 1/02; H04N 5/38
[52] U.S. Cl. .................................. 455/103; 328/163; 330/124 R; 330/149; 358/186
[58] Field of Search ...................... 455/8, 59, 103, 105, 455/108, 109; 358/186; 328/163; 330/124 R, 124 D, 149

[56] References Cited

U.S. PATENT DOCUMENTS 2,840,696  6/1958  Beck et al. ............................ 455/105

Primary Examiner—Marc E. Bookbinder
Attorney, Agent, or Firm—Eugene M. Whitacre; Paul J. Rasmussen; William H. Meise

[57] ABSTRACT

A broadcast transmitter has the outputs of two high-power output stages combined for increased power. For enhanced reliability, two exciters or sources of broadband signals are provided, and a switch couples the signal from the selected exciter to a signal splitter. In the signal splitter, the selected signal is divided into two equal portions, and each portion is coupled to the input of one of the two high-power stages. Two surface acoustic-wave filters are provided for limiting the bandwidth of the signal as transmitted. The filters may have different phase characteristics in the passband. Two or more distortion correction arrangements are provided for predistorting the signal for correcting for differential gain, differential phase or incidental phase distortions arising in the high-power stages. In order to avoid cancellation of the combined output signal, each of the filters is coupled in the line between one of the exciters and the switch, so the signal selected by the switch and applied to the high power stages passes through only one filter. For improved compensation of distortion, each of the distortion correction arrangements is coupled in one of the lines between the signal splitter and the input of each high-power stage.

9 Claims, 4 Drawing Figures

PARALLEL OPERATION OF MULTIPLE TV TRANSMITTERS

BACKGROUND OF THE INVENTION

This invention relates to an arrangement for paralleling multiple TV transmitters to obtain high power output.

It is well known to parallel output stages of a power-handling device to increase the output power. Thus, the output power can be doubled (3 dB) by combining two output stages, trebled (4.7 dB) by the use of three output stages, and so forth. The paralleling of outputs in addition to providing higher power also provides improved reliability, in that operation at reduced power continues if one of the output stages fails.

In television broadcasting, reliability of the transmitter is economically important. Consequently, it is desirable to operate a plurality of power stages which are combined to produce the desired output signal. In order to further enhance the reliability of a broadcast transmitter, the prior art includes the signal processing and control stages associated with each power output stage in the paralleled arrangement. Thus, each power stage and its associated level adjusting (ALC) system, attenuators, linearity correctors, filters and the like are considered as one unit, and a plurality of such units ar paralleled. In such an arrangement, failure of one of the control or signal processing circuits associated with a power output stage merely causes reduced output power rather than complete failure.

Among the signal processing circuits currently in use are surface acoustic-wave (SAW) filters. These filters are useful for forming vestigial sidebands because of their small size, repeatability from unit to unit and the like. SAW filters have the disadvantage, however, that the signal transit time and consequently the phase-shift are temperature-dependent. While changes in phase attributable to SAW filters may be minimized by the use of ovens, it has been found that the operation of SAW filters in parallel gives rise to differential phase shifts between the two channels. Such phase shifts may cause large changes in the output power produced by the combined output stages and increases the power dissipated in the power stages themselves. Consequently, the parallel approach has proved to be deficient.

Another approach in the prior art provides reliability in a different manner. In this arrangement, the power stages are paralleled and their combined input is coupled by means of a selecting switch to one of a plurality of control and signal processing arrangements. Thus, for example, two separate and independent signal processing arrangements may be provided, one of which is normally in use and one of which is in standby. Upon the occurrence of a failure in the operating signal processing arrangement, the selecting switch is thrown to select the standby unit, and operation continues as before.

However, in such an arrangement the correction of linearity by predistortion of the signal is comprised, because the distortion generated by each of the paralleled output stages is different in amplitude and phase, and the resulting combined distortion is difficult to predict. Consequently, the design of the linearity correctors becomes complex and in practice a compromise predistortion must be accepted. The compromise distortion is undesirable in that if one of the output stages fails, the predistortion is no longer correct for the single output stage alone. In this case, the failure mode causes increased distortion in addition to the drop in output power. An additional disadvantage of this arrangement is apparent when a closed-loop automatic level control (ALC) is desired. For proper operation, the power control attenuator must proceed the IF linearity and incidental phase correction circuits so that the overall system linearity is not changed by changes in power level. This arrangement requires that ALC loop control circuits sample both high power amplifier outputs and provide control signals to both exciters. Hence, the two high power amplifier controls are not independent and reliability is compromised.

SUMMARY OF THE INVENTION

A broadcast transmitter includes first and second sources of broadband signals and first and second high power signal translating stages, the outputs of which are combined to form an output terminal of the transmitter. A selecting switch and a signal splitter are coupled to the sources of signals and to the high power signal translating stages for selecting the signals of one of the sources and splitting the selected signal into equal portions which are applied to the high power stages.

Two filters are provided for band-limiting the signals, but may have different phase responses. First and second linearity correction circuits are also provided for predistorting the signals applied to the high power stages for compensating for the distortion introduced by the high power stages. In order to avoid differential phase shifts which might cause cancellation of the combined output signal, the filters are coupled between the first and second signal sources, respectively, and the selecting switch so that the selected signal is filtered by only one of the filters. The selected signal is divided by the splitter and applied by the first and second distortion correction circuits to the inputs of the first and second high power stages, respectively, so that each distortion correcting circuit predistorts the signal applied to only one of the high power stages.

DESCRIPTION OF THE INVENTION

Figure 1:
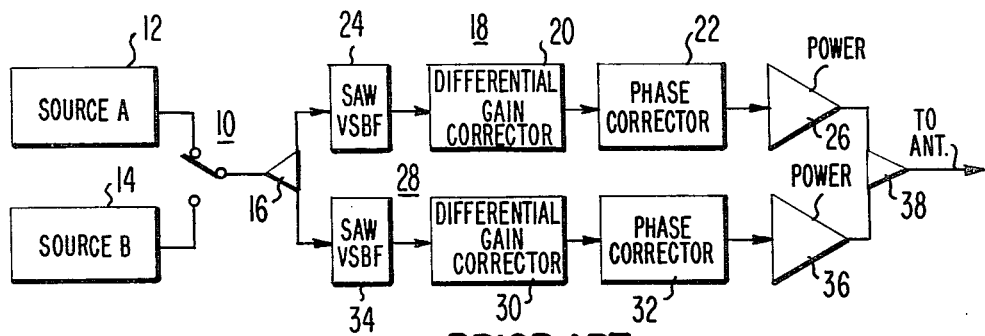
FIG. 1 is a block diagram illustrating a prior art transmitter arrangement in which each high power output stage and its control and signal processing functions are paralleled as units.

In FIG. 1, a signal selecting switch 10 selects a signal from first and second signal sources 12 and 14. The selected signal is applied to a signal splitter 16 which divides the selected signal into two equal portions. Outputs from splitter 16 are applied to two parallel channels designated generally as 18 and 28. Signal channel 18 includes a differential gain corrector 20, an incidental phase corrector 22, a SAW vestigial sideband filter 24, and a high power stage 26. Similarly, channel 28 includes a differential gain corrector 30, incidental phase corrector 32, SAW vestigial sideband filter 34 and a high power stage 36. The outputs of high power stages 26 and 36 are combined by means of a combiner 38, and the output of combiner 38 is coupled to an antenna, not shown.

In the arrangement of FIG. 1, reliability is enhanced by redundant sources 12 and 14 which may be selected by means of switch 10. The signal so selected is divided in splitter 16 and processed by channels 18 and 28, and recombined in combiner 38. A failure of an element in channel 18 or 28 affects only that channel, allowing operation to continue in the other channel. Consequently, operation of the transmitter continues notwithstanding the failure, albeit at reduced power. However, filters 24 and 34 have a temperature-sensitive phase response as mentioned earlier, and the phase of the output signals from channel 18 and 28 may drift. The output power will be reduced by the cosine of the phase angle difference of the output signals from channels 18 and 28, and the remainder of the power not transferred to the antenna is dissipated internally in power stages 26 and 36. Continued out-of-phase operation may lead to early failure of components in the power stages due to overheating.

Figure 2:
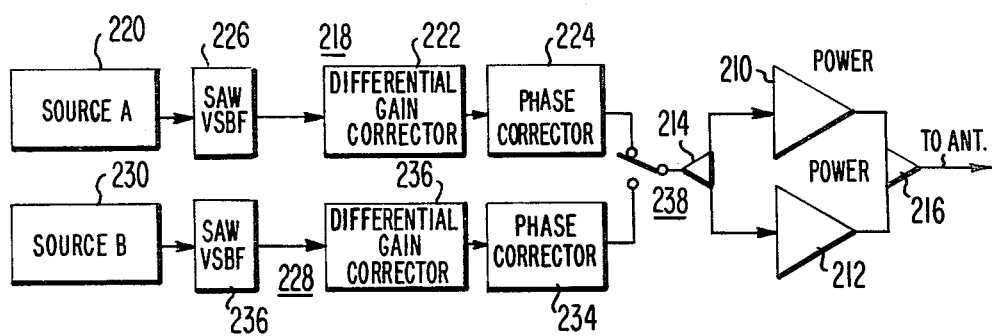
FIG. 2 is a block diagram illustrating a prior art transmitter arrangement in which the high power output stages are paralleled and a selecting switch selects an input signal from one of a plurality of control and signal processing circuits.

In FIG. 2, power stages 210 and 212 are paralleled by use of an input splitter 214 and an output combiner 216. For enhanced reliability, the signal sources are arranged into channels designated generally as 218 and 228. The outputs of channels 218 and 228 are routed to the terminals of a selector switch 238 by which the signal from one of the channels is selected for application to the paralleled output stages.

Channel 218 includes a source 220, a differrential gain corrector 222, a phase corrector 224, and a SAW vestigial sideband filter 226. Similarly, channel 228 includes a source 230, differential gain corrector 232, phase corrector 234 and SAW filter 236. In operation of the arrangement of FIG. 2, channels 218 and 228 produce signals which can be used to drive the parallel output stages. Selector switch 238 is normally set to select a signal from channel 218 and apply that signal by way of splitter 214 to power stages 210 and 212. In the event of a failure in power stage 210 or 212, operation continues at lower power. In the event of a failure in signal channel 218, switch 238 is thrown and operation continues with signals from channel 228.

In the arrangement of FIG. 2, the distortion of the signal caused by power stage 210 in general will not be equal to that caused by power stage 212. Consequently, the total distortion is extremely complex and hard to predict. The design of the differential gain corrector 222 and phase corrector 224 is therefore difficult since the requirements depend upon the particular combination of power stages selected. If simple linearity correction circuits are used, only a compromise correction is possible.

Figure 3:
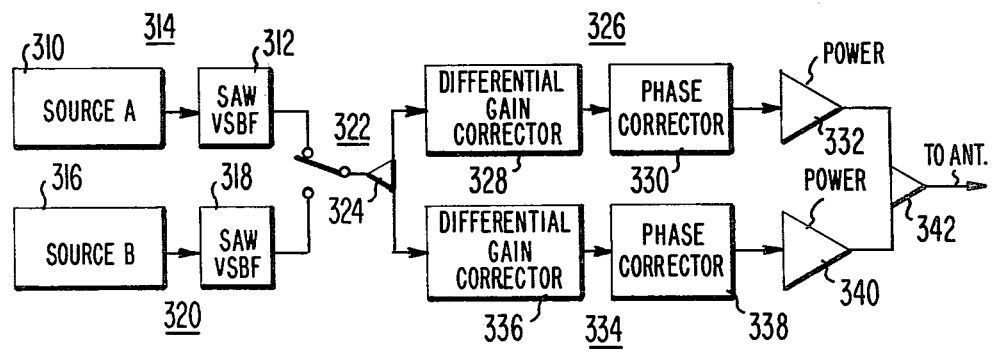
FIGS. 3 and 4 are simplified and detailed block diagrams, respectively, of a transmitter with paralleled stages according to two embodiments of the invention.

In FIG. 3, the source 310 and SAW filter 312 form a first signal processing channel 314, and a second source 316 and SAW filter 318 form a second signal processing channel 320. The outputs of channels 314 and 320 are coupled to the terminals of a selector switch 322 by which the processed signal from channel 314 or 316 is selected for application to the paralleled stages. The selected signal is applied to a signal splitter 324, which drives paralleled channels 326 and 334. Channel 326 includes a differential gain corrector 328, a phase corrector 330 and a power output stage 332. Channel 334 includes a differential gain corrector 336, a phase corrector 338 and a power output stage 340. The outputs of power stages 332 and 340 are combined in a combining circuit 342 for application to an antenna, not shown.

In the event of a failure of an element in one of channels 326 and 334, the other channel remains unaffected and operation of the transmitter continues at lower power. In normal operation, the signal at the output of channel 314 is used to drive the paralleled stages. In the event of a failure in channel 314, selector switch 322 is thrown to another position and the output signal from channel 320 is used instead. The SAW filters are located in channels 314 and 320, so that the selected signal passes through only one SAW filter. The SAW filters are not paralleled. Consequently, reduction of output signal and increased power dissipation in the output stages cannot occur as in the arrangement of FIG. 1. Similarly, differential gain corrector 328 may be adjusted to predistort the signal applied to power stage 332 alone. Corrector 328 does not have to provide predistortion for any other power stage. Similarly, phase corrector 330 needs only correct the phase for power stage 332. Also, correctors 336 and 338 predistort the signal applied to power stage 340 alone. Consequently, the design of the linearity correctors is simplified by comparison with that in FIG. 2. No compromise linearity correction is necessary, as in the FIG. 2 arrangement. Thus, the inventive arrangement provides the desired reliability without the disadvantages of the prior art arrangements.

Figure 4:
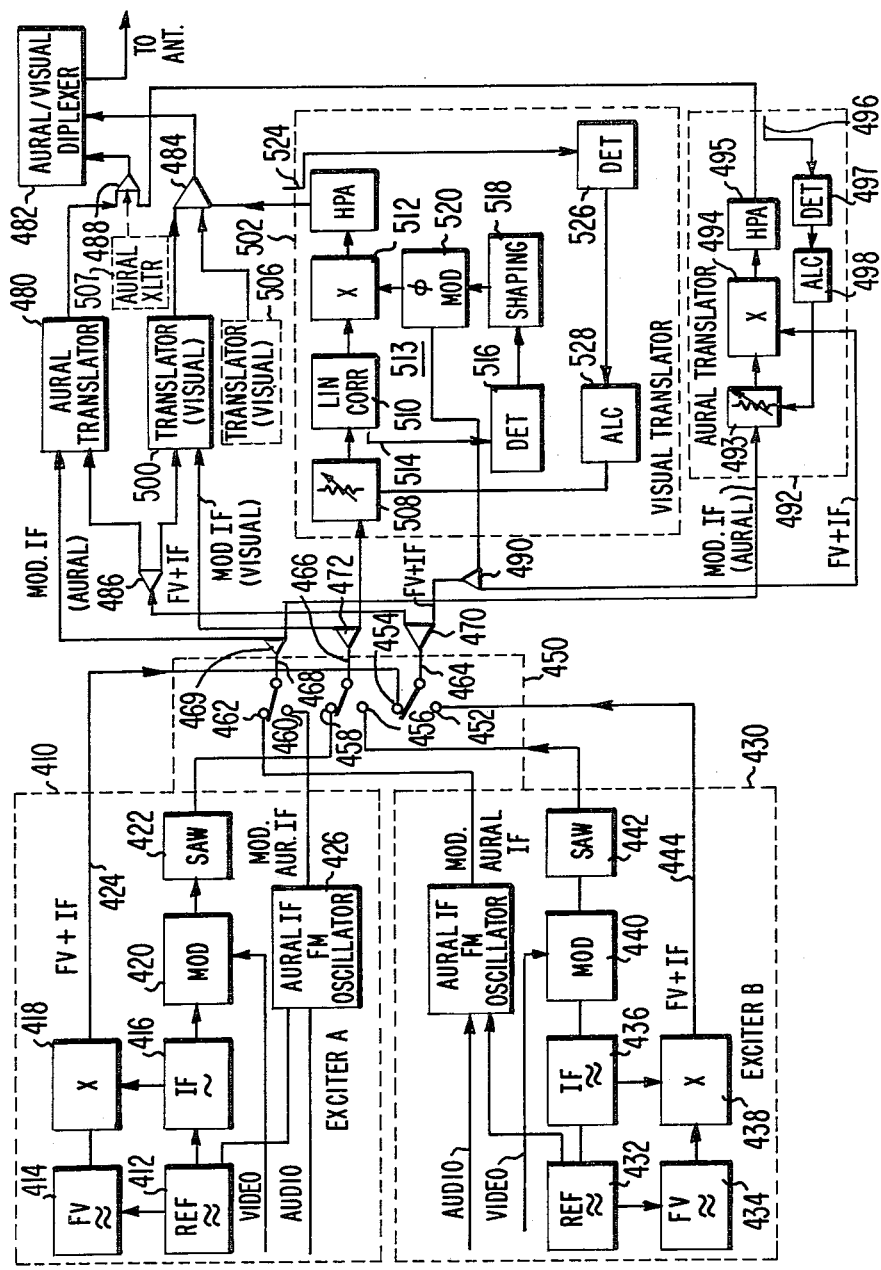

Generally speaking, FIG. 4 illustrates at upper left an exciter 410 which receives audio and video signals from an external source, not shown, and at lower left is a similar exciter 430. The outputs of exciters 410 and 430 are applied to a switching circuit designated generally as 450. The signals selected by switching circuit 450 are applied in parallel to aural power translators 480 at upper right and 492 at lower right and in parallel to visual power translators 500 and 502. The outputs of visual translators 500 and 502 are combined in a combining circuit 484, and the visual signals thus combined are diplexed together with the aural signal from translators 480, 492 via a similar combining circuit 488 in an aural/visual diplexer 482. The output of diplexer 482 is coupled to an antenna, not shown.

Exciter 410 includes a reference signal source 412, outputs of which are coupled to a visual-carrier frequency (FV) synthesizer 414 and visual IF-frequency synthesizer 416. The outputs of synthesizers 414 and 416 are applied to a mixer 418, and the sum signal FV+IF is led out from exciter 410 over a conductor 424 to a terminal 454 of switching circuit 450.

An output from IF synthesizer 416 of exciter 410 is coupled to a modulator 420 and is modulated by video from an external source, not shown. The modulated IF signal from modulator 420 is coupled to a vestigial-sideband SAW filter 422. The shaped or band-limited signal from SAW filter 422 is coupled to a terminal 458 of switching circuit 450.

Audio from an external source, not shown, is applied to an aural IF frequency-modulated oscillator 426, also part of exciter 410. The output of oscillator 426 is coupled to a terminal 460 of switching circuit 450. Similarly, audio is applied to exciter 430, the aural IF output of which is applied to a terminal 462, modulated visual IF is coupled to terminal 456, and FV+IF signal is coupled to terminal 452 of switch 450.

The FV+IF signal selected by switching circuit 450 is coupled to conductor 464, the selected modulated visual IF signals are coupled to conductor 466 and the selected modulated aural IF signals are coupled to conductor 468 for application to the aural transmitter, as mentioned. The selected modulated visual IF signal on conductor 466 is applied to a signal splitter 472, and is divided into two portions, one of which is applied to visual translator 500 and the other of which is applied to visual translator 502. Translator 500 is identical to translator 502, and detailed discussion will be limited to translator 502.

The modulated visual IF signal as divided by splitter 472 is applied to a controllable attenuator 508. The attenuated modulated IF signal from attenuator 508 is applied to a linearity corrector 510 and thence to an input of a mixer 512. The attenuated modulated IF from attenuator 508 is also applied to an incidental phase corrector 513, which includes a signal sampler 514, which samples a portion of the signal and applies the sample to a detector 516 for demodulation. The demodulated signal from detector 516 is applied by way of a video shaping network 518 to a control input of a phase modulator 520. The selected FV+IF signal on conductor 464 is divided by splitters 470, 486 and 490 and one sample is applied through phase modulator 520 to mixer 512. The output of mixer 512 is a predistorted modulated signal at the desired output frequency which is applied to a high power amplifier 522 to produce the high power output of visual translator 502. A signal sampler 524 is coupled to the output of amplifier 522, and the sampled signal is applied to a detector 526 for demodulation. The demodulated signal from detector 526 is applied to an automatic level control circuit 528, the output of which is coupled to attenuator 508 for controlling the output level of visual translator 502 in a feedback manner. In operation, linearity corrector 510 responds to the signal from attenuator 508 and predistorts the signals to compensate for the amplitude distortion produced by high power amplifier 522. Sampler 514, detector 516 and shaping circuit 518 produce a control signal in response to the amplitude of the modulated signal from attenuator 508 which phase-modulates the FV+IF signal for predistorting the phase of the signal applied to high power amplifier 522 for correcting for incidental phase modulation produced by the amplifier.

Aural translator 492 receives a frequency modulated aural IF signal and a FV+IF continuous wave (CW) signal from either exciter via switching circuit 450 and splitters 469 and 490 respectively. The modulated aural IF is applied to mixer 494 via attenuator 493 together with the FV+IF signal from splitter 490. The mixer output is a frequency modulated signal at the desired output frequency which is applied to a high power amplifier 495. An automatic level control loop is provided which includes sampler 496, detector 497, ALC circuit 498 and attenuator 493 and which controls the output level of aural translator 492.

Other embodiments of the invention will be obvious to those skilled in the art. For example, additional high power translator stages such as visual translator 506 and aural translator 507, illustrated in phantom in FIG. 4 may be used in a similar manner to obtain additional output power or additional reliability. Other types of linearity correction may be used in conjunction with linearity corrector 510 and incidental phase corrector 513. The benefits of the invention are achieved even if only a single aural translator is used rather than plural paralleled translators.

What is claimed is:

1. A broadcast transmitter, comprising:
   first and second sources of broadband amplitude-modulated signals to be amplified;
   first and second filters coupled to said first and second sources, respectively, for limiting said broadband signals to a predetermined frequency band, said first and second filters being subject to relative phase changes therebetween;
   switch means coupled to said first and second filters for selecting one of the band-limited signals;
   signal splitting means coupled to said switch means for dividing the selected one of said band-limited signals into first and second equal portions;
   first and second high-power signal translating stages, said high-power signal translating stages subjecting signals being translated therethrough to distortion;
   first and second distortion correction means coupled to said signal splitting means and to said first and second high-power signal translating stages for coupling the first portion of said selected one of said band-limited signals to said first high-power translating stage and for coupling the second equal portion of said selected one of said band-limited signals to said second high-power stage; and
   combining means coupled to the outputs of said first and second high power signal translating stages for combining the high power translated signals to form a combined output signal.

2. A transmitter according to claim 1 wherein said first and second filters comprise surface acoustic-wave filters.

3. A transmitter according to claim 1 wherein said relative phase change between said first and second filters results from temperature changes.

4. A transmitter according to claim 2 wherein said first and second filters are each maintained at a constant temperature.

5. A transmitter according to claim 1 wherein said high power signal translating stages comprise high-power amplifiers.

6. A transmitter according to claim 1 wherein said high power signal translating stages comprise mixers for upconverting a modulated signal to the desired output frequency.

7. A broadcast transmitter, comprising:
   first and second sources of broadband signals;
   first and second high power signal translating stages subjected signals being translated thereby to distortion, the outputs of which are combined to form an output terminal of the transmitter;
   switch and signal splitting means coupled to said first and second sources of signals and to said first and second high power signal translating stages for selecting the signals of one of said first and second sources and splitting the selected signal into first and second equal portions which are applied to said first and second high-power signal translating stages, respectively;
   first and second filter means for band-limiting said signals, said filter means being subject to phase differences therebetween;
   first and second distortion correction means for predistorting the signals applied to said high-power signal translating stages for compensating for the distortion introduced by said high-power signal translating stages;
   wherein the improvement lies in that in order to avoid cancellation of said combined output signal said first and second filter means are coupled between said first and second signal sources, respectively, and said switch and signal splitting means whereby said selected signal is filtered by only one of said first and second filter means for eliminating phase errors between the signals at said outputs of the translating stages, and in that said first and second distortion correction means are coupled between said switch and signal splitting means and said first and second high-power signal translating stages, respectively, whereby said first and second distortion correcting means each compensate only one of said high power signal translating stages.

8. A broadcast transmitter in accordance with claim 7 wherein said phase difference between said first and second filter means results from temperature changes.

9. A broadcast transmitter in accordance with claim 7 or 8 wherein said first and second filter means comprise SAW devices.

* * * * *